United States Patent
Hong

(10) Patent No.: US 11,405,976 B2
(45) Date of Patent: Aug. 2, 2022

(54) METHOD AND APPARATUS FOR CONTROLLING RADIO RESOURCE CONTROL RRC STATE AND BASE STATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 396 days.

(21) Appl. No.: 16/468,273

(22) PCT Filed: Dec. 22, 2016

(86) PCT No.: PCT/CN2016/111414
§ 371 (c)(1),
(2) Date: Jun. 10, 2019

(87) PCT Pub. No.: WO2018/112817
PCT Pub. Date: Jun. 28, 2018

(65) Prior Publication Data
US 2020/0077463 A1   Mar. 5, 2020

(51) Int. Cl.
*H04W 76/27* (2018.01)
*H04W 28/02* (2009.01)
*H04W 88/02* (2009.01)

(52) U.S. Cl.
CPC ....... *H04W 76/27* (2018.02); *H04W 28/0278* (2013.01); *H04W 88/02* (2013.01)

(58) Field of Classification Search
None
See application file for complete search history.

(56) References Cited

U.S. PATENT DOCUMENTS

2009/0124212 A1   5/2009   Islam et al.
2009/0129339 A1   5/2009   Young et al.
(Continued)

FOREIGN PATENT DOCUMENTS

CN   101911815 A   12/2010
CN   104081869 A   10/2014
(Continued)

OTHER PUBLICATIONS

CN First Office Action in Application No. 201680001881.6, dated Jan. 20, 2021.
(Continued)

*Primary Examiner* — Ajit Patel
(74) *Attorney, Agent, or Firm* — Syncoda LLC; Feng Ma

(57) ABSTRACT

A method of controlling a radio resource control (RRC) state includes: when user equipment (UE) is in an RRC inactive state and has to-be-transmitted service data, UE information of the UE and data information of the to-be-transmitted service data for the UE are determined; and when the UE information of the UE and/or the data information of the to-be-transmitted service data for the UE satisfy a preset condition, the UE is controlled to switch to an RRC connected state. An apparatus and a base station employing the method can accurately and effectively determine the RRC state of the UE, thereby improving the transmission efficiency of service data between the base station and the UE.

13 Claims, 5 Drawing Sheets

(56) References Cited

U.S. PATENT DOCUMENTS

| | | | |
|---|---|---|---|
| 2011/0299485 A1 | 12/2011 | Hannu et al. | |
| 2012/0307703 A1 | 12/2012 | Young et al. | |
| 2013/0064125 A1* | 3/2013 | Gintis | H04L 43/50 |
| | | | 370/252 |
| 2013/0194941 A1 | 8/2013 | Lu et al. | |
| 2013/0329637 A1 | 12/2013 | Kodali et al. | |
| 2015/0016397 A1* | 1/2015 | Han | H04W 92/10 |
| | | | 370/329 |
| 2015/0117342 A1* | 4/2015 | Loehr | H04W 72/1284 |
| | | | 370/329 |
| 2016/0219646 A1 | 7/2016 | Ramasamy et al. | |
| 2018/0176834 A1* | 6/2018 | Wei | H04W 36/0016 |
| 2018/0184372 A1* | 6/2018 | Tang | H04W 52/02 |
| 2018/0213530 A1* | 7/2018 | Mochizuki | H04L 5/0044 |

FOREIGN PATENT DOCUMENTS

| | | |
|---|---|---|
| CN | 104170477 A | 11/2014 |
| CN | 104754759 A | 7/2015 |
| CN | 105898894 A | 8/2016 |

OTHER PUBLICATIONS

Samsung:"Overall procedure for data transfer in inactive state", 3GPP TSG-RAN WG2 Meeting #6, Reno, USA, Nov. 14-18, 2016, R2-168051.

CN Written Opinion of the International Searching Authority in Application No. PCT/CN2016/111414, dated Sep. 11, 2017.

ISA State Intellectual Property Office of the People's Republic of China, International Search Report Issued in Application No. PCT/CN2016/111414, dated Sep. 11, 2017, WIPO, 5 pages.

\* cited by examiner

METHOD AND APPARATUS FOR CONTROLLING RADIO RESOURCE CONTROL RRC STATE AND BASE STATION

CROSS-REFERENCE TO RELATED APPLICATIONS

The present application is a national stage application of PCT Application No. PCT/CN2016/111414 filed on Dec. 22, 2016, the disclosure which is incorporated herein by reference in its entirety.

TECHNICAL FIELD

The present disclosure relates to the field of communications technologies, and in particular, to a method and an apparatus for controlling an RRC state, and a base station.

BACKGROUND

In a Long-Term Evolution (LTE) system, two radio resource control (RRC) states are defined for user equipment (UE), which are respectively an idle state and a connected state. When the UE needs to process a service, the UE may establish an RRC connection with the mobile communication network, that is, the RRC state is switched to the connected state from the idle state, and then transmit the service data to a network side device. During the process in which the UE is switched to the connected state from the idle state, more signaling overhead may be generated and the time taken is relatively long, thereby causing a relatively long data transmission delay.

In the related art, in the research and discussion of the 5-th Generation (5G) mobile communication technology project, the UE may also have an RRC inactive state in addition to the RRC idle state and the RRC connected state. When the UE is in the RRC inactive state, the base station may store context information of the UE. Therefore, during the process in which the UE is switched to the RRC connected state from the RRC inactive state, the generated signaling overhead is less and the time taken is short. In the related art, the base station generally cannot actively determine the RRC state of the UE, cannot accurately determine that the UE is currently suitable in which RRC state, and thus cannot flexibly and accurately control the UE to switch to the RRC connected state from the RRC inactive state at an appropriate time, thereby reducing the transmission efficiency of service data of the UE.

SUMMARY

To overcome the problems in the related art, examples of the present disclosure provide a method and an apparatus for controlling an RRC state, and a base station, so as to accurately and effectively determine the RRC state of the UE, thereby improving the transmission efficiency of service data between the base station and the UE.

According to a first aspect of examples of the present disclosure, a method of controlling an RRC state is provided, which includes:

when UE is in an RRC inactive state and has to-be-transmitted service data, determining UE information of the UE and data information of the to-be-transmitted service data for the UE; and when the UE information of the UE and/or the data information of the to-be-transmitted service data for the UE satisfy a preset condition, controlling the UE to switch to an RRC connected state.

In an example, the UE information of the UE includes: a UE type and a UE capability;

determining the UE information of the UE includes:

determining the UE type and the UE capability according to context information of the UE stored locally; or acquiring the UE type and the UE capability from signaling associated with applying for radio resource configuration information sent by the UE.

In an example, the method further includes:

calculating a first switching index associated with the UE information according to the UE type and the UE capability of the UE; and when the first switching index is greater than a first switching threshold, determining that the UE information of the UE satisfies the preset condition.

In an example, the data information of the to-be-transmitted service data for the UE includes: a service type, a Quality of Service (QoS) configuration parameter and a buffered uplink data amount of to-be-transmitted uplink service data for the UE;

determining the data information of the to-be-transmitted service data for the UE includes:

acquiring the service type and the QoS configuration parameter of the to-be-transmitted service data from signaling associated with applying for radio resource configuration information sent by the UE; and receiving the buffered uplink data amount reported by the UE in a preset reporting manner.

In an example, the method further includes:

calculating a second switching index associated with the to-be-transmitted uplink service data according to the service type, the QoS configuration parameter and the buffered uplink data amount of the to-be-transmitted uplink service data for the UE; and when the second switching index is greater than a second switching threshold, determining that the data information of the to-be-transmitted service data for the UE satisfies the preset condition.

In an example, the data information of the to-be-transmitted service data for the UE includes: a service type, a QoS configuration parameter and a buffered downlink data amount of to-be-transmitted downlink service data for the UE;

determining the data information of the to-be-transmitted service data for the UE includes:

receiving a data packet of the to-be-transmitted service data that is to be sent to the UE;

acquiring the service type and the QoS configuration parameter of the to-be-transmitted service data from the data packet; and querying the buffered downlink data amount for the UE stored in a buffer of a base station in a preset query manner.

In an example, the method further includes:

calculating a third switching index associated with the to-be-transmitted downlink service data according to the service type, the QoS configuration parameter and the buffered downlink data amount of the to-be-transmitted downlink service data for the UE; and when the third switching index is greater than a third switching threshold, determining that the data information of the to-be-transmitted service data for the UE satisfies the preset condition.

In an example, the method further includes:

calculating a fourth switching index associated with the UE information and a fifth switching index associated with the to-be-transmitted service data;

performing weight sum of the fourth switching index and the fifth switching index to obtain a sixth switching index; and when the sixth switching index is greater than a fourth switching threshold, determining that the UE information of the UE and the data information of the to-be-transmitted service data for the UE satisfy the preset condition.

According to a second aspect of examples of the present disclosure, an apparatus for controlling an RRC state is provided, which includes:

an information determining module, configured to determine UE information of UE and data information of to-be-transmitted service data for the UE when the UE is in an RRC inactive state and has the to-be-transmitted service data; and a switching module, configured to control the UE to switch to an RRC connected state when the information determining module determines that the UE information of the UE and/or the data information of the to-be-transmitted service data for the UE satisfy a preset condition.

In an example, the UE information of the UE includes: a UE type and a UE capability;

the information determining module includes:

a determining sub-module, configured to determine the UE type and the UE capability according to context information of the UE stored locally; or a first analyzing sub-module, configured to acquire the UE type and the UE capability from signaling associated with applying for radio resource configuration information sent by the UE.

In an example, the apparatus further includes:

a first calculating module, configured to calculate a first switching index associated with the UE information according to the UE type and the UE capability of the UE; and a first determining module, configured to determine that the UE information of the UE satisfies the preset condition when the first switching index calculated by the first calculating module is greater than a first switching threshold.

In an example, the data information of the to-be-transmitted service data for the UE includes: a service type, a QoS configuration parameter and a buffered uplink data amount of to-be-transmitted uplink service data for the UE;

the information determining module includes:

a second analyzing sub-module, configured to acquire the service type and the QoS configuration parameter of the to-be-transmitted service data from signaling associated with applying for radio resource configuration information sent by the UE; and a first receiving sub-module, configured to receive the buffered uplink data amount reported by the UE in a preset reporting manner.

In an example, the apparatus further includes:

a second calculating module, configured to calculate a second switching index associated with the to-be-transmitted uplink service data according to the service type, the QoS configuration parameter and the buffered uplink data amount of the to-be-transmitted uplink service data for the UE; and a second determining module, configured to determine that the data information of the to-be-transmitted service data for the UE satisfies the preset condition when the second switching index calculated by the second calculating module is greater than a second switching threshold.

In an example, the data information of the to-be-transmitted service data for the UE includes: a service type, a QoS configuration parameter and a buffered downlink data amount of to-be-transmitted downlink service data for the UE;

the information determining module includes:

a second receiving sub-module, configured to receive a data packet of the to-be-transmitted service data that is to be sent to the UE;

a third analyzing sub-module, configured to acquire the service type and the QoS configuration parameter of the to-be-transmitted service data from the data packet; and a querying sub-module, configured to query the buffered downlink data amount for the UE stored in a buffer of a base station in a preset query manner.

In an example, the apparatus further includes:

a third calculating module, configured to calculate a third switching index associated with the to-be-transmitted downlink service data according to the service type, the QoS configuration parameter and the buffered downlink data amount of the to-be-transmitted downlink service data for the UE; and a third determining module, configured to determine that the data information of the to-be-transmitted service data for the UE satisfies the preset condition when the third switching index calculated by the third calculating module is greater than a third switching threshold.

In an example, the apparatus further includes:

a fourth calculating module, configured to calculate a fourth switching index associated with the UE information and a fifth switching index associated with the to-be-transmitted service data;

a weighting module, configured to perform weight sum of the fourth switching index and the fifth switching index which are calculated by the fourth calculating module to obtain a sixth switching index; and a fourth determining module, configured to determine that the UE information of the UE and the data information of the to-be-transmitted service data for the UE satisfy the preset condition when the sixth switching index obtained by the weighting module is greater than a fourth switching threshold.

According to a third aspect of examples of the present disclosure, a base station is provided, which includes:

a processor; and a storage configured to store processor-executable instructions;

where the processor is configured to:

when UE is in an RRC inactive state and has to-be-transmitted service data, determine UE information of the UE and data information of the to-be-transmitted service data for the UE; and when the UE information of the UE and/or the data information of the to-be-transmitted service data for the UE satisfy a preset condition, control the UE to switch to an RRC connected state.

The technical scheme provided in examples of the present disclosure may include the following beneficial effects:

When UE is in an RRC inactive state and has to-be-transmitted service data, the base station may determine UE information of the UE and data information of the to-be-transmitted service data, such as a UE type, a UE capability, a service type of the to-be-transmitted service data, a QoS of the to-be-transmitted service data and so on. When the UE information of the UE and/or the data information of the to-be-transmitted service data satisfy a preset condition, the UE is controlled to switched to the RRC connected state. By the above technical solutions, the UE is controlled to switch to the RRC connected state from the RRC inactive state at an appropriate time, thereby improving the transmission efficiency of service data between the base station and the UE.

It shall be appreciated that the above general descriptions and the following detailed descriptions are merely illustrative and explanatory and cannot limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1A:
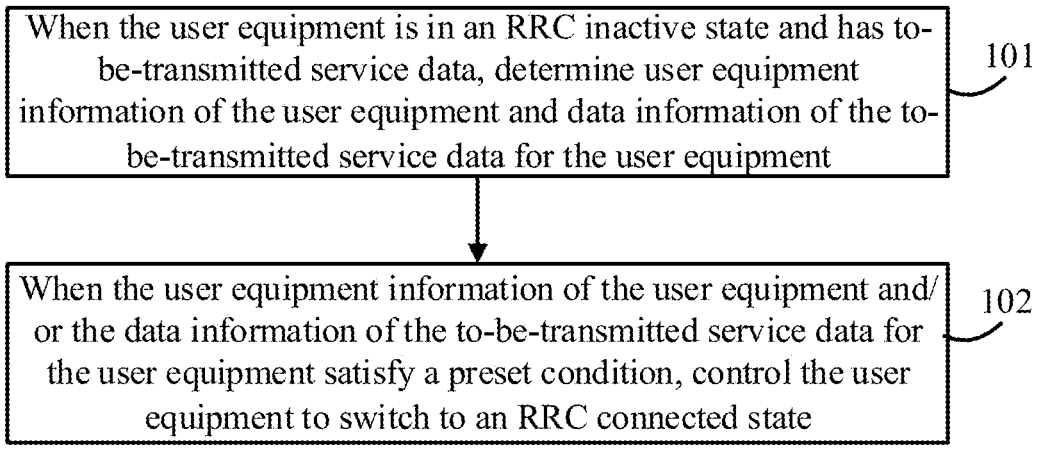
FIG. 1A is a flowchart of a method of controlling an RRC state according to an example.

Examples will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The technical solution provided by the present disclosure is applicable to a new generation network, for example, a 5G network. The RRC state of UE in the 5G network includes: an RRC inactive state, an RRC connected state and an RRC idle state. In the RRC inactive state, the UE can perform data transmission of a small amount of data with the base station, and the base station may store context information of the UE. The time taken by the UE to enter the RRC connected state from the RRC inactive state is shorter than the time taken by the UE enter the RRC connected state from the RRC idle state, and the interaction signaling associated with entering the RRC connected state from the RRC inactive state is less than the interaction signaling associated with entering the RRC connected state from the RRC idle state, so that the UE may quickly enter the RRC connected state from the RRC inactive state and the signaling overhead is reduced.

Figure 1B:
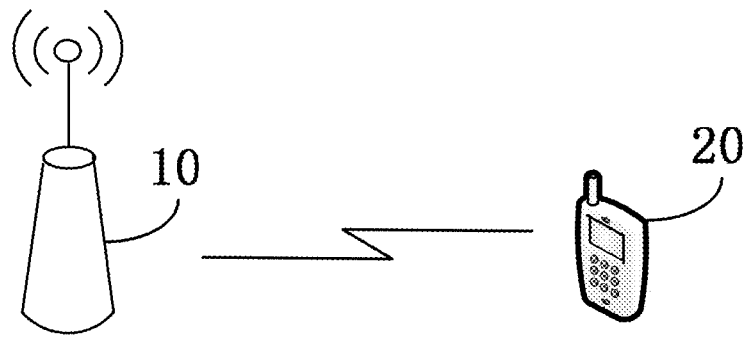
FIG. 1B is a schematic diagram of a scenario of a method of controlling an RRC state according to an example.

FIG. 1A is a flowchart of a method of controlling an RRC state according to an example, and FIG. 1B is a schematic diagram of a scenario of a method of controlling an RRC state according to an example. The method of controlling an RRC state may be applied to a base station. As shown in FIG. 1A, the method of controlling an RRC state includes the following steps 101-102.

At step 101, when UE is in an RRC inactive state and has to-be-transmitted service data, UE information of the UE and data information of the to-be-transmitted service data for the UE are determined.

In an example, the description that the UE has the to-be-transmitted service data may be understood as the UE has uplink service data to be sent to the base station or the base station has downlink data to be sent to the UE.

In an example, the UE information of the UE may include a UE type and a UE capability.

In an example, the UE type may be included in the context information of the UE. For example, the UE type is an Internet of Things terminal. The amount of service data generated by the different types of UE may be different.

In an example, the UE may actively report own capability upon a first Attach. When the UE is in the RRC connected state or the RRC inactive state, the base station may always store the UE capability. The UE capability may be divided into a capability related to wireless access and a capability related to core network, for example, the radio frequency capability of the UE, that is, the capability of frequency bands which the UE can support, and so on. In an example, the capability levels of the UE are different and the peak rate of data transmission may also be different.

In an example, the data information of the to-be-transmitted service data for the UE may include: a service type, a Quality of Service (QoS) configuration parameter, and an buffered uplink data amount of to-be-transmitted uplink service data for the UE; and a service type, a QoS configuration parameter, and a buffered downlink data amount of to-be-transmitted downlink service data for the UE.

In an example, the service type, the QoS configuration parameter and the buffered uplink data amount of the to-be-transmitted uplink service data for the UE, and the service type, the QoS configuration parameter and the buffered downlink data amount of the to-be-transmitted downlink service data for the UE may be obtained by using solutions of the related art.

In an example, the buffered uplink data amount for the UE may be reported by the UE in a preset reporting manner. In an example, when an amount of the data stored in a buffer, that is the buffered data amount, reaches a preset value, such as 20 bits, the UE may report the buffered uplink data amount to the base station. In another example, the UE may report the buffered data amount every preset time. The UE may negotiate with the base station to determine a reporting manner which is to be used by the UE to report the buffered uplink data amount.

At step 102, when the UE information of the UE and/or the data information of the to-be-transmitted service data for the UE satisfy a preset condition, the UE is controlled to switch to an RRC connected state.

In an example, the preset condition may be set by a system.

Figure 2:
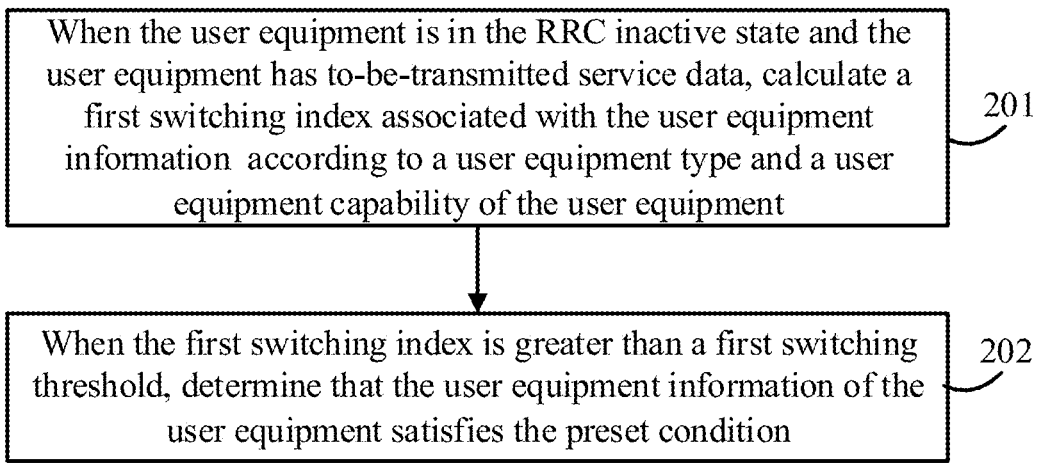
FIG. 2 is a flowchart of a method of determining that UE information of UE satisfies a preset condition according to an example.
Figure 3:
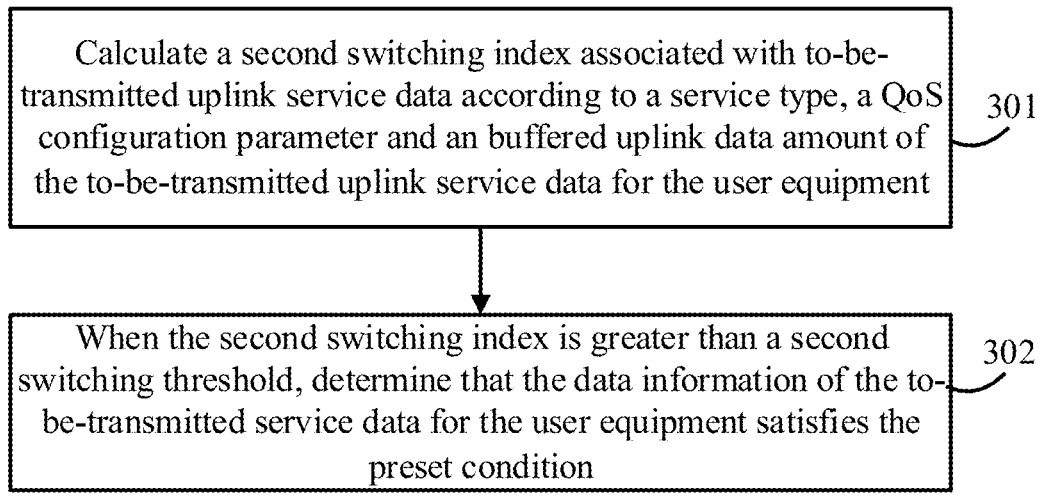
FIG. 3 is a flowchart of a method of determining that data information of to-be-transmitted uplink service data for UE satisfies a preset condition according to an example.
Figure 4:
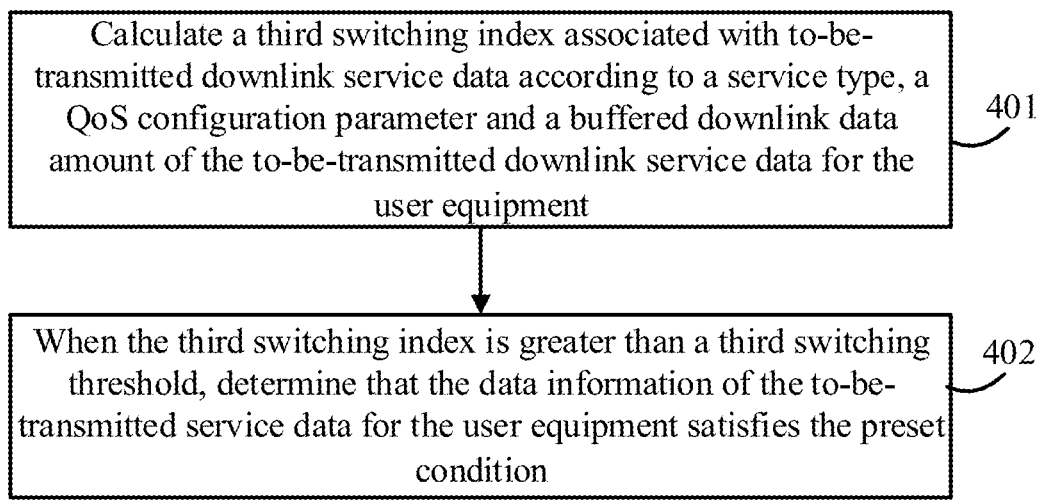
FIG. 4 is a flowchart of a method of determining that data information of to-be-transmitted downlink service data for UE satisfies a preset condition according to an example.
Figure 5:
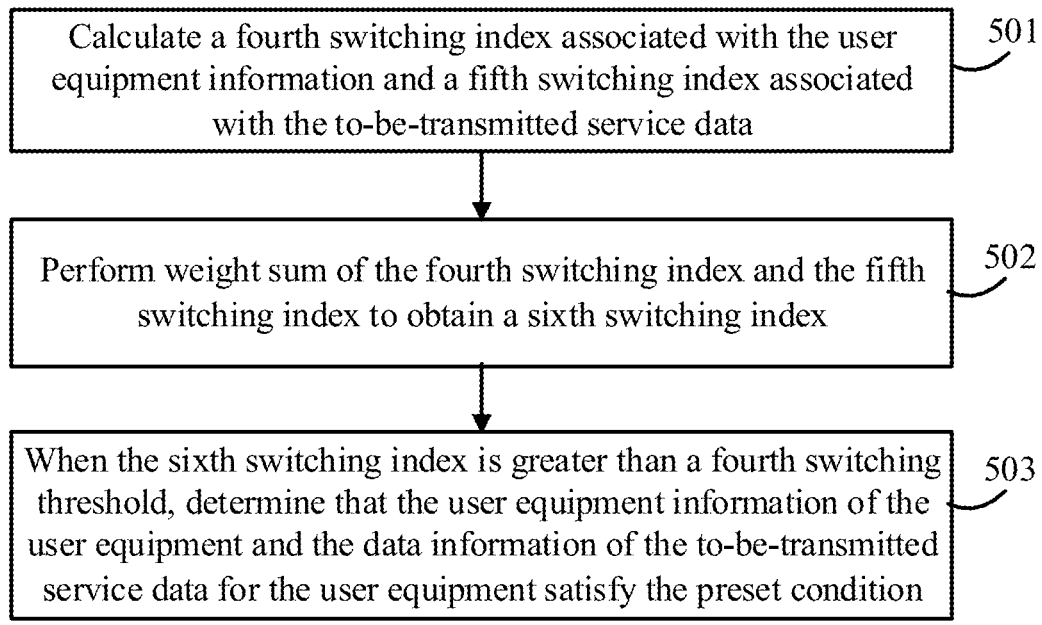
FIG. 5 is a flowchart of a method of determining that UE information of UE and data information of to-be-transmitted service data for the UE satisfy a preset condition according to an example.

In an example, a process of determining that the UE information of the UE satisfies the preset condition may refer to an example shown in FIG. 2; a process of determining that the data information of the to-be-transmitted uplink service data for the UE satisfies the preset condition may refer to an example shown in FIG. 3; a process of determining that the data information of the to-be-transmitted downlink service data for the UE satisfies the preset condition may refer to an example shown in FIG. 4; a process of determining that the UE information of the UE and the data information of the to-be-transmitted service data for the UE satisfy the preset condition may refer to an example shown in FIG. 5.

In an example, the UE may be controlled to switch to the RRC connected state in a way that an instruction to switch to the RRC connected state is sent to the UE.

In an exemplary scenario, as shown in FIG. 1B, take a mobile network being a 5G network as an example for illustration. In the scenario shown in FIG. 1B, a base station 10 and UE 20 are included. When the UE 20 is in the RRC inactive state and has to-be-transmitted service data, the base station 10 may determine whether UE information and/or data information of the to-be-transmitted service data satisfy a preset condition. And when the preset condition is satisfied, the base station 10 controls the UE 20 to switch to the RRC connected state. In this way, the UE may automatically switch to the RRC connected state from the RRC inactive state, thereby improving the efficiency of data transmission.

In the example, by the foregoing steps 101-102, the UE is controlled to switch to the RRC connected state from the RRC inactive state at an appropriate time, thereby improving the transmission efficiency of service data between the base station and the UE.

In an example, the UE information of the UE includes: a UE type and a UE capability;
   determining the UE information of the UE includes:
   determining the UE type and the UE capability according to the context information of the UE stored locally; or
   acquiring the UE type and the UE capability from signaling associated with applying for radio resource configuration information sent by the UE.

In an example, the method of controlling an RRC state may further include:
   calculating a first switching index associated with the UE information according to the UE type and the UE capability of the UE; and
   when the first switching index is greater than a first switching threshold, determining that the UE information of the UE satisfies the preset condition.

In an example, the data information of the to-be-transmitted service data for the UE includes: a service type, a QoS configuration parameter and a buffered uplink data amount of to-be-transmitted uplink service data for the UE;
   determining the data information of the to-be-transmitted service data for the UE includes:
   acquiring the service type and the QoS configuration parameter of the to-be-transmitted service data from signaling associated with applying for radio resource configuration information sent by the UE; and
   receiving the buffered uplink data amount reported by the UE in a preset reporting manner.

In an example, the method of controlling an RRC state may further include:
   calculating a second switching index associated with the to-be-transmitted uplink service data according to the service type, the QoS configuration parameter and the buffered uplink data amount of the to-be-transmitted uplink service data for the UE; and
   when the second switching index is greater than a second switching threshold, determining that the data information of the to-be-transmitted service data for the UE satisfies the preset condition.

In an example, the data information of the to-be-transmitted service data for the UE includes: a service type, a QoS configuration parameter and a buffered downlink data amount of to-be-transmitted downlink service data for the UE;
   determining data information of the to-be-transmitted service data for the UE includes:
   receiving a data packet of the to-be-transmitted service data that is to be sent to the UE;
   acquiring the service type and the QoS configuration parameter of the to-be-transmitted service data from the data packet; and
   querying the buffered downlink data amount for the UE stored in a buffer of a base station in a preset query manner.

In an example, the method of controlling an RRC state may further include:
   calculating a third switching index associated with the to-be-transmitted downlink service data according to the service type, the QoS configuration parameter and the buffered downlink data amount of the to-be-transmitted downlink service data for the UE; and
   when the third switching index is greater than a third switching threshold, determining that the data information of the to-be-transmitted service data for the UE satisfies the preset condition.

In an example, the method of controlling an RRC state may further include:
   calculating a fourth switching index associated with the UE information and a fifth switching index associated with the to-be-transmitted service data;
   performing weight sum of the fourth switching index and the fifth switching index to obtain a sixth switching index; and
   when the sixth switching index is greater than a fourth switching threshold, determining that the UE information of the UE and the data information of the to-be-transmitted service data for the UE satisfy the preset condition.

The detail on how to switch the RRC state may refer to subsequent examples.

The technical solutions provided by examples of the present disclosure are described below by detailed description.

FIG. 2 is a flowchart of a method of determining that UE information of UE satisfies a preset condition according to an example. The example uses the above methods provided by examples of the present disclosure to illustrate the method of determining that UE information of UE satisfies a preset condition. As shown in FIG. 2, the method includes the following steps.

At step 201, when the UE is in the RRC inactive state and has the to-be-transmitted service data, a first switching index associated with the UE information is calculated according to a UE type and a UE capability of the UE.

In an example, the UE type and the UE capability may be determined according to the context information of the UE stored locally. In an example, the UE type and the UE capability may also be acquired from the signaling associated with applying for radio resource configuration information sent by the UE.

In an example, a switching index may be set for each UE type and each UE capability. For example, the uplink and downlink data rates of the Internet of Things terminal are relatively low, so the switching index of the Internet of Things terminal may be set to be relatively low, such as 0.3; and the switching index of the UE capability of the Internet of Things terminal may be set to 0.2. Weighting summation is performed on the switching index of the UE type of the Internet of Things terminal and the switching index of the capability of the Internet of Things terminal to obtain the first switching index.

At step 202, when the first switching index is greater than a first switching threshold, it is determined that the UE information of the UE satisfies the preset condition.

In an example, the first switching threshold may be a default threshold set by the system, such as, 0.8.

In the example, by the foregoing steps 201-202, the base station may control the switching of the RRC state according to the first switching index associated with the UE information of the UE and the first switching threshold, thereby improving the data transmission performance of the UE with relative fast uplink and downlink data rates and a relative high UE capability level.

FIG. 3 is a flowchart of a method of determining that data information of to-be-transmitted uplink service data for UE satisfies a preset condition according to an example. The example uses the foregoing methods provided by examples of the present disclosure to illustrate the method of determining that data information of to-be-transmitted uplink service data for UE satisfies a preset condition. As shown in FIG. 3, the method includes the following steps.

At step 301, a second switching index associated with to-be-transmitted uplink service data is calculated according to a service type, a QoS configuration parameter and a buffered uplink data amount of the to-be-transmitted uplink service data for the UE.

In an example, the service type and the QoS configuration parameter of the to-be-transmitted service data may be acquired from the signalling associated with applying for the radio resource configuration information, and the signaling is sent by the UE. For example, for the service data, the service type is a Tencent service, and the QoS Class Identifier (QCI) is 6.

In an example, the buffered uplink data amount may be determined by receiving the buffered uplink data amount reported by the UE in a preset reporting manner. In an example, when an amount of the data stored in a buffer, that is the buffered data amount, reaches a preset value, such as 20 bits, the UE may report the buffered uplink data amount to the base station. In another example, the UE may report the buffered data amount every preset time. The UE may negotiate with the base station to determine a reporting manner which is to be used by the UE to report the buffered uplink data amount.

In an example, a corresponding weight coefficient may be set in advance for each parameter associated with the to-be-transmitted uplink service data, for example, for the to-be-transmitted service data, the weight coefficient of the service type is set to 0.2, and the weight coefficient of the QoS configuration parameter is set to 0.2, and the weight coefficient of the buffered uplink data amount is set to 0.6. In still another example, a switching index may be set in advance for each parameter, for example, the switching index of the service type as Tencent is set to 0.5.

In an example, when the buffered uplink data amount is greater than a preset data amount threshold, it is determined that the data information of the to-be-transmitted uplink service data satisfies the preset condition. The preset data amount threshold may be preset by the system. Different preset data amount thresholds may be set for different types of UE and different capabilities of UE.

In an example, the second switching index may be obtained by calculating a sum of a product between the weight coefficient and the switching index associated with each parameter.

At step 302, when the second switching index is greater than a second switching threshold, it is determined that the data information of the to-be-transmitted service data for the UE satisfies the preset condition.

In the example, by the foregoing steps 301-302, the base station may control the switching of the RRC state according to the second switching index associated with the to-be-transmitted uplink service data for the UE and the second switching threshold.

FIG. 4 is a flowchart of a method of determining that data information of to-be-transmitted downlink service data for UE satisfies a preset condition according to an example. The example uses the above methods provided by examples of the present disclosure to illustrate the method of determining that data information of to-be-transmitted downlink service data for UE satisfies a preset condition. As shown in FIG. 4, the method includes the following steps:

In step 401, a third switching index associated with to-be-transmitted downlink service data is calculated according to a service type, a QoS configuration parameter and a buffered downlink data amount of the to-be-transmitted downlink service data for the UE.

In an example, a data packet of the to-be-transmitted service data that is to be sent to the UE is received; and the service type and the QoS configuration parameter of the to-be-transmitted service data are acquired from the data packet. In an example, the base station queries an amount of the data stored in a buffer of the base station, that is the buffered data amount, in a preset query manner, for example, the buffered data amount is queried each time the service data in the buffer is updated, or the buffered data amount is queried every preset time.

In an example, a corresponding weight coefficient may be set in advance for each parameter associated with the to-be-transmitted downlink service data, for example, for the to-be-transmitted service data, the weight coefficient of the service type is set to 0.2, the weight coefficient of the QoS configuration parameter is set to 0.2, and the weight coefficient of the buffered downlink data amount is set to 0.6. In still another example, a switching index may be set in advance for each parameter, for example, the switching index of the service type as Tencent is set to 0.5.

In an example, when the buffered downlink data amount is greater than a preset data amount threshold, it is determined that the data information of the to-be-transmitted downlink service data satisfies the preset condition. The preset data amount threshold may be preset by the system. Different preset data amount thresholds may be set for different types of UE and different capabilities of UE.

In an example, the third switching index may be obtained by calculating a sum of a product between the weight coefficient and the switching index associated with each parameter.

At step 402, when the third switching index is greater than a third switching threshold, it is determined that the data information of the to-be-transmitted service data for the UE satisfies the preset condition.

In the example, by the foregoing steps 401-402, the base station may control the switching of the RRC state according to the third switching index associated with the to-be-transmitted downlink service data for the UE and the third switching threshold.

FIG. 5 is a flowchart of a method of determining that UE information of UE and data information of to-be-transmitted service data for the UE satisfy a preset condition according to an example. The example uses the above methods provided by examples of the present disclosure to illustrate the method of determining that UE information of UE and data information of to-be-transmitted service data for the UE satisfy a preset condition. As shown in FIG. 5, the method includes the following steps:

At step 501, a fourth switching index associated with the UE information and a fifth switching index associated with the to-be-transmitted service data are calculated.

In an example, the fourth switching index associated with the UE information may be calculated according to the flowchart of the example shown in FIG. 2, and detail is not described herein.

In an example, the fifth switching index associated with the to-be-transmitted service data may be the second switching index associated with to the to-be-transmitted uplink service data, the fifth switching index may be calculated according to the flowchart of the example shown in FIG. 3, and detail is not described herein. In another example, the fifth switching index associated with the to-be-transmitted service data may be the third switching index associated with the to-be-transmitted downlink service data, the fifth switching index may be calculated according to the flowchart of the example shown in FIG. 4, and detail is not described herein. In still another example, the fifth switching index associated with the to-be-transmitted service data may also be a weighting sum of the switching index associated with the to-be-transmitted downlink service data and the switching index associated with the to-be-transmitted uplink service data. The weight coefficient associated with the to-be-transmitted uplink service data and the weight coefficient associated with the to-be-transmitted downlink service data may be preset by the system.

At step 502, weighting summation is performed for the fourth switching index and the fifth switching index to obtain a sixth switching index.

In an example, the weight coefficient of the fourth switching index associated with the UE information and the weight coefficient of the fifth switching index associated with the to-be-transmitted service data may be preset by the base station, for example, the weight coefficient of the fourth switching index associated with the UE information is 0.3, and the weight coefficient of the fifth switching index associated with the to-be-transmitted service data is 0.7.

At step 503, when the sixth switching index is greater than a fourth switching threshold, it is determined that the UE information of the UE and the data information of the to-be-transmitted service data for the UE satisfy the preset condition.

In the example, by the foregoing steps 501-503, the base station may comprehensively determine whether to control the UE to switch to the RRC connected state according to the UE information of the UE and the data information of the to-be-transmitted service data, thereby more accurately and effectively determining the RRC state of the UE and thus improving the transmission efficiency of service data.

Figure 6:
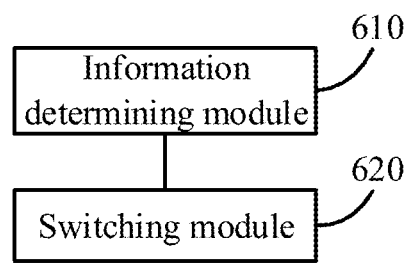
FIG. 6 is a block diagram of an apparatus for controlling an RRC state according to an example.

FIG. 6 is a block diagram of an apparatus for controlling an RRC state according to an example. As shown in FIG. 6, the apparatus for controlling an RRC state includes:

an information determining module 610, configured to determine UE information of UE and data information of to-be-transmitted service data for the UE when the UE is in an RRC inactive state and has the to-be-transmitted service data; and a switching module 620, configured to control the UE to switch to an RRC connected state when the information determining module determines that the UE information of the UE and/or the data information of the to-be-transmitted service data for the UE satisfy a preset condition.

Figure 7:
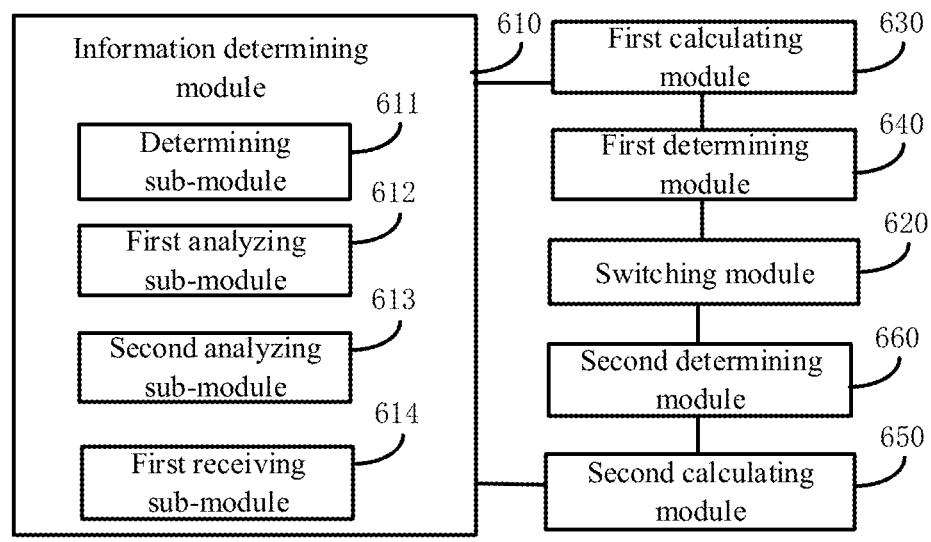
FIG. 7 is a block diagram of another RRC state control apparatus according to an example.

FIG. 7 is a block diagram of another apparatus for controlling an RRC state according to an example. As shown in FIG. 7, on the basis of the foregoing example shown in FIG. 6, in an example, the UE information of the UE includes: a UE type and a UE capability;

the information determining module 610 includes:

a determining sub-module 611, configured to determine the UE type and the UE capability according to context information of the UE stored locally; or a first analyzing sub-module 612, configured to acquire the UE type and the UE capability from signaling associated with applying for radio resource configuration information sent by the UE.

In an example, the apparatus further includes:

a first calculating module 630, configured to calculate a first switching index associated with the UE information according to the UE type and the UE capability of the UE; and a first determining module 640, configured to determine that the UE information of the UE satisfies the preset condition when the first switching index calculated by the first calculating module 630 is greater than a first switching threshold.

In an example, the data information of the to-be-transmitted service data for the UE includes: a service type, a QoS configuration parameter and a buffered uplink data amount of to-be-transmitted uplink service data for the UE;

the information determining module 610 includes:

a second analyzing sub-module 613, configured to acquire the service type and the QoS configuration parameter of the to-be-transmitted service data from signaling associated with applying for radio resource configuration information sent by the UE; and a first receiving sub-module 614, configured to receive the buffered uplink data amount reported by the UE in a preset reporting manner.

In an example, the apparatus further includes:

a second calculating module 650, configured to calculate a second switching index associated with the to-be-transmitted uplink service data according to the service type, the QoS configuration parameter and the buffered uplink data amount of the to-be-transmitted uplink service data for the UE; and a second determining module 660, configured to determine that the data information of the to-be-transmitted service data for the UE satisfies the preset condition when the second switching index calculated by the second calculating module 650 is greater than a second switching threshold.

Figure 8:
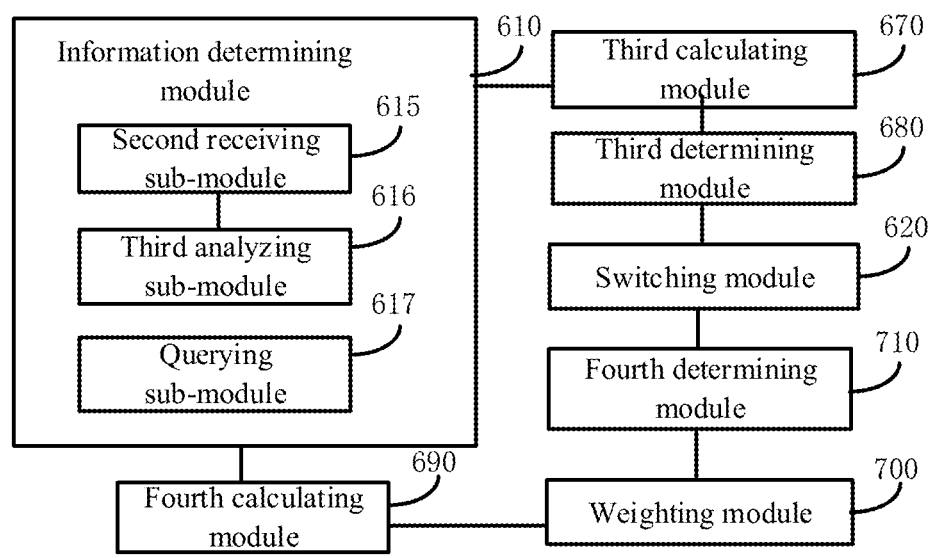
FIG. 8 is a block diagram of still another RRC state control apparatus according to an example.

FIG. 8 is a block diagram of still another apparatus for controlling an RRC state according to an example. As shown in FIG. 8, on the basis of the foregoing example shown in FIG. 6 and/or FIG. 7, in an example, the data information of the to-be-transmitted service data for the UE includes: a service type, a QoS configuration parameter and a buffered downlink data amount of to-be-transmitted downlink service data for the UE;

the information determining module 610 includes:

a second receiving sub-module 615, configured to receive a data packet of the to-be-transmitted service data that is to be sent to the UE;

a third analyzing sub-module 616, configured to acquire the service type and the QoS configuration parameter of the to-be-transmitted service data from the data packet; and a querying sub-module 617, configured to query the buffered downlink data amount for the UE stored in a buffer of a base station in a preset query manner.

In an example, the apparatus further includes:

a third calculating module 670, configured to calculate a third switching index associated with the to-be-transmitted downlink service data according to the service type, the QoS configuration parameter and the buffered downlink data amount of the to-be-transmitted downlink service data for the UE; and a third determining module 680, configured to determine that the data information of the to-be-transmitted service data for the UE satisfies the preset condition when the third switching index calculated by the third calculating module 670 is greater than a third switching threshold.

In an example, the apparatus further includes:

a fourth calculating module 690, configured to calculate a fourth switching index associated with the UE information and a fifth switching index associated with the to-be-transmitted service data;

a weighting module 700, configured to perform weight sum of the fourth switching index and the fifth switching index which are calculated by the fourth calculating module 690 to obtain a sixth switching index; and a fourth determining module 710, configured to determine that the UE information of the UE and the data information of the to-be-transmitted service data for the UE satisfy the preset condition when the sixth switching index obtained by the weighting module 700 is greater than a fourth switching threshold.

For the apparatus in the above examples, the specific manner in which the respective modules perform the operations has been described in detail in the examples relating to the method, and will not be explained in detail herein.

Figure 9:
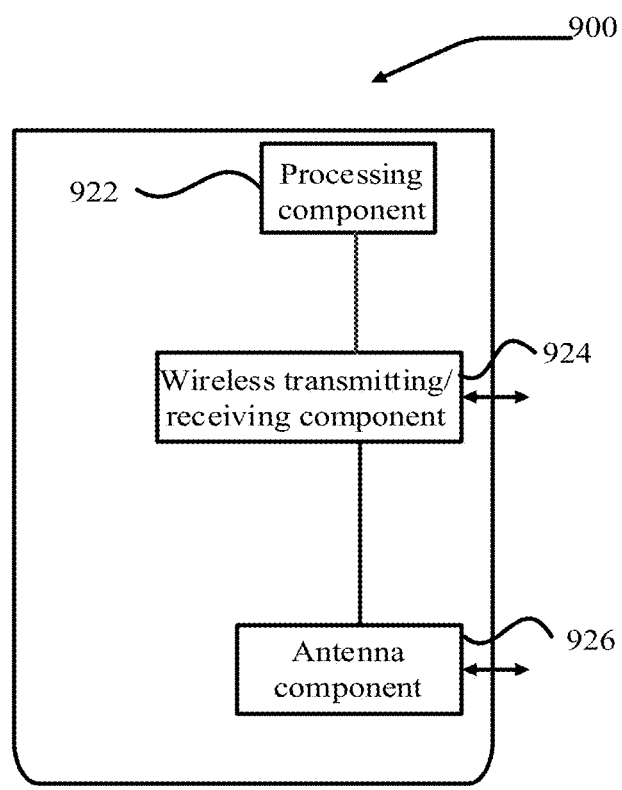
FIG. 9 is a block diagram of a device suitable for controlling an RRC state according to an example.

FIG. 9 is a block diagram of a device suitable for controlling an RRC state according to an example. The device 900 may be a base station. Referring to FIG. 9, the device 900 includes a processing component 922, a wireless transmitting/receiving component 924, an antenna component 926, and a signal processing portion specific to the wireless interface. The processing component 922 may further include one or more processors.

A processor in the processing components 922 may be configured to:

when UE is in an RRC inactive state and has to-be-transmitted service data, determine UE information of the UE and data information of the to-be-transmitted service data for the UE; and when the UE information of the UE and/or the data information of the to-be-transmitted service data for the UE satisfy a preset condition, control the UE to switch to an RRC connected state.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method of controlling a Radio Resource Control (RRC) state, comprising:

when user equipment (UE) is in an RRC inactive state and has to-be-transmitted uplink service data, determining, by a fifth-generation base station, UE information of the UE and data information of the to-be-transmitted uplink service data for the UE, wherein the UE information of the UE comprises a UE type and a UE capability; and when the determined UE information of the UE and/or the determined data information of the to-be-transmitted uplink service data for the UE satisfy a preset condition, controlling, by the fifth-generation base station, the UE to switch to an RRC connected state;

the method further comprising:

calculating a fourth switching index associated with the UE information and a fifth switching index associated with the to-be-transmitted uplink service data;

performing weight sum of the fourth switching index and the fifth switching index to obtain a sixth switching index; and when the sixth switching index is greater than a fourth switching threshold, determining that the UE information of the UE and the data information of the to-be-transmitted uplink service data for the UE satisfy the preset condition.

2. The method of claim 1, wherein the determining the UE information of the UE comprises:

determining the UE type and the UE capability according to context information of the UE stored locally, or acquiring the UE type and the UE capability from signaling associated with applying for radio resource configuration information sent by the UE.

3. The method of claim 2, further comprising:

calculating a first switching index associated with the UE information according to the UE type and the UE capability of the UE; and when the first switching index is greater than a first switching threshold, determining that the UE information of the UE satisfies the preset condition.

4. The method of claim 1, wherein the data information of the to-be-transmitted uplink service data for the UE comprises: a service type, a Quality of Service (QoS) configuration parameter and a buffered uplink data amount of to-be-transmitted uplink service data for the UE; and the determining the data information of the to-be-transmitted uplink service data for the UE comprises:

acquiring the service type and the QoS configuration parameter of the to-be-transmitted uplink service data from signaling associated with applying for radio resource configuration information sent by the UE; and receiving the buffered uplink data amount reported by the UE in a preset reporting manner.

5. A method of controlling a Radio Resource Control (RRC) state, comprising:

when user equipment (UE) is in an RRC inactive state and has to-be-transmitted uplink service data, determining, by a fifth-generation base station, UE information of the UE and data information of the to-be-transmitted uplink service data for the UE, wherein the UE information of the UE comprises a UE type and a UE capability; and when the determined UE information of the UE and/or the determined data information of the to-be-transmitted uplink service data for the UE satisfy a preset condition, controlling, by the fifth-generation base station, the UE to switch to an RRC connected state;

wherein the data information of the to-be-transmitted uplink service data for the UE comprises: a service type, a Quality of Service (QoS) configuration parameter and a buffered uplink data amount of to-be-transmitted uplink service data for the UE; and the determining the data information of the to-be-transmitted uplink service data for the UE comprises:

acquiring the service type and the QoS configuration parameter of the to-be-transmitted uplink service data from signaling associated with applying for radio resource configuration information sent by the UE; and receiving the buffered uplink data amount reported by the UE in a preset reporting manner;

the method further comprising:

calculating a second switching index associated with the to-be-transmitted uplink service data according to the service type, the QoS configuration parameter and the buffered uplink data amount of the to-be-transmitted uplink service data for the UE; and when the second switching index is greater than a second switching threshold, determining that the data information of the to-be-transmitted uplink service data for the UE satisfies the preset condition.

6. An apparatus employing the method of controlling a Radio Resource Control (RRC) state according to claim 1, the apparatus comprising:

an information determining module, configured to determine user equipment (UE) information of UE and data information of to-be-transmitted uplink service data for the UE when the UE is in an RRC inactive state and has the to-be-transmitted uplink service data;

a switching module, configured to control the UE to switch to an RRC connected state when the information determining module determines that the UE information of the UE and/or the data information of the to-be-transmitted uplink service data for the UE satisfy a preset condition; and a wireless transmitting/receiving portion and an antenna configured to transmit signals containing the service data;

wherein:

the UE information of the UE comprises a UE type and a UE capability; and the information determining module comprises:

a determining sub-module, configured to determine the UE type and the UE capability according to context information of the UE stored locally, or a first analyzing sub-module, configured to acquire the UE type and the UE capability from signaling associated with applying for radio resource configuration information sent by the UE;

the apparatus further comprising:

a first calculating module, configured to calculate a first switching index associated with the UE information according to the UE type and the UE capability of the UE; and a first determining module, configured to determine that the UE information of the UE satisfies the preset condition when the first switching index calculated by the first calculating module is greater than a first switching threshold.

7. The apparatus of claim 6, wherein the data information of the to-be-transmitted uplink service data for the UE comprises: a service type, a Quality of Service (QoS) configuration parameter and a buffered uplink data amount of to-be-transmitted uplink service data for the UE; and the information determining module comprises:

a second analyzing sub-module, configured to acquire the service type and the QoS configuration parameter of the to-be-transmitted uplink service data from signaling associated with applying for radio resource configuration information sent by the UE; and a first receiving sub-module, configured to receive the buffered uplink data amount reported by the UE in a preset reporting manner.

8. The apparatus of claim 7, further comprising:

a second calculating module, configured to calculate a second switching index associated with the to-be-transmitted uplink service data according to the service type, the QoS configuration parameter and the buffered uplink data amount of the to-be-transmitted uplink service data for the UE; and a second determining module, configured to determine that the data information of the to-be-transmitted uplink service data for the UE satisfies the preset condition when the second switching index calculated by the second calculating module is greater than a second switching threshold.

9. A fifth-generation base station, comprising:

a processor; and a storage configured to store processor-executable instructions;

wherein the processor is configured to:

when user equipment (UE) is in a Radio Resource Control (RRC) inactive state and has to-be-transmitted uplink service data, determine UE information of the UE and data information of the to-be-transmitted uplink service data for the UE, wherein the UE information of the UE comprises: a UE type and a UE capability; and when the determined UE information of the UE and/or the determined data information of the to-be-transmitted uplink service data for the UE satisfy a preset condition, control the UE to switch to an RRC connected state;

wherein the processor is further configured to:

calculate a fourth switching index associated with the UE information and a fifth switching index associated with the to-be-transmitted uplink service data;

perform weight sum of the fourth switching index and the fifth switching index to obtain a sixth switching index; and when the sixth switching index is greater than a fourth switching threshold, determine that the UE information of the UE and the data information of the to-be-transmitted uplink service data for the UE satisfy the preset condition.

10. The base station of claim 9, wherein the processor is configured to determine the UE information of the UE by:

determining the UE type and the UE capability according to context information of the UE stored locally, or acquiring the UE type and the UE capability from signaling associated with applying for radio resource configuration information sent by the UE.

11. The base station of claim 10, wherein the processor is further configured to:
  calculate a first switching index associated with the UE information according to the UE type and the UE capability of the UE; and
  when the first switching index is greater than a first switching threshold, determine that the UE information of the UE satisfies the preset condition.

12. The base station of claim 9, wherein the data information of the to-be-transmitted uplink service data for the UE comprises: a service type, a Quality of Service (QoS) configuration parameter and a buffered uplink data amount of to-be-transmitted uplink service data for the UE; and
  the processor is configured to determine the data information of the to-be-transmitted uplink service data for the UE by:
    acquiring the service type and the QoS configuration parameter of the to-be-transmitted uplink service data from signaling associated with applying for radio resource configuration information sent by the UE; and
    receiving the buffered uplink data amount reported by the UE in a preset reporting manner.

13. The base station of claim 12, wherein the processor is further configured to:
  calculate a second switching index associated with the to-be-transmitted uplink service data according to the service type, the QoS configuration parameter and the buffered uplink data amount of the to-be-transmitted uplink service data for the UE; and
  when the second switching index is greater than a second switching threshold, determine that the data information of the to-be-transmitted uplink service data for the UE satisfies the preset condition.

* * * * *